INVENTORS
PAUL J. CUSHING
PAUL M. ENRIGHT
BY
ATTORNEYS

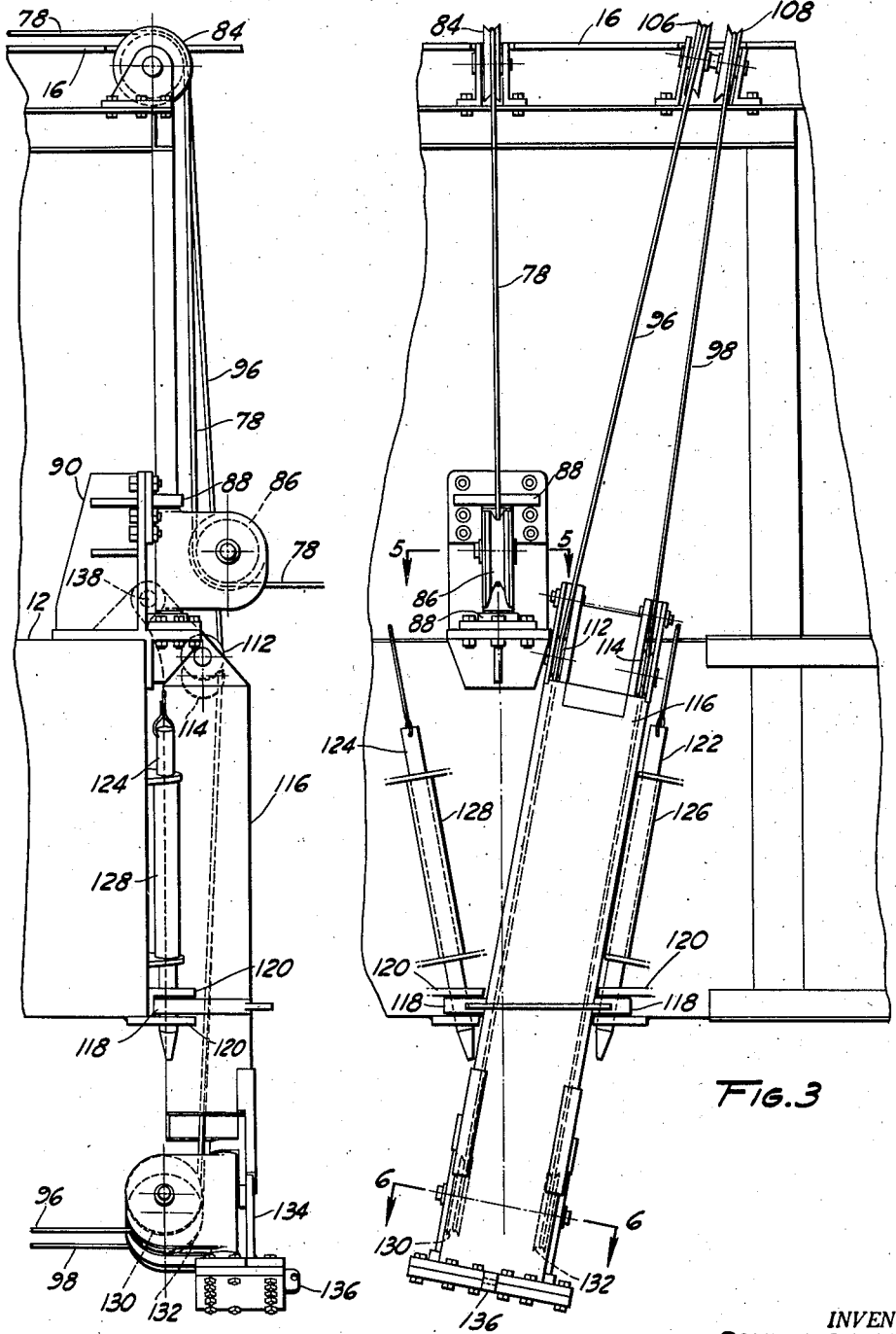

Feb. 8, 1949.        P. J. CUSHING ET AL        2,461,311
CONTROL SYSTEM FOR HYDRAULIC DREDGES
Filed Dec. 29, 1945        7 Sheets-Sheet 5
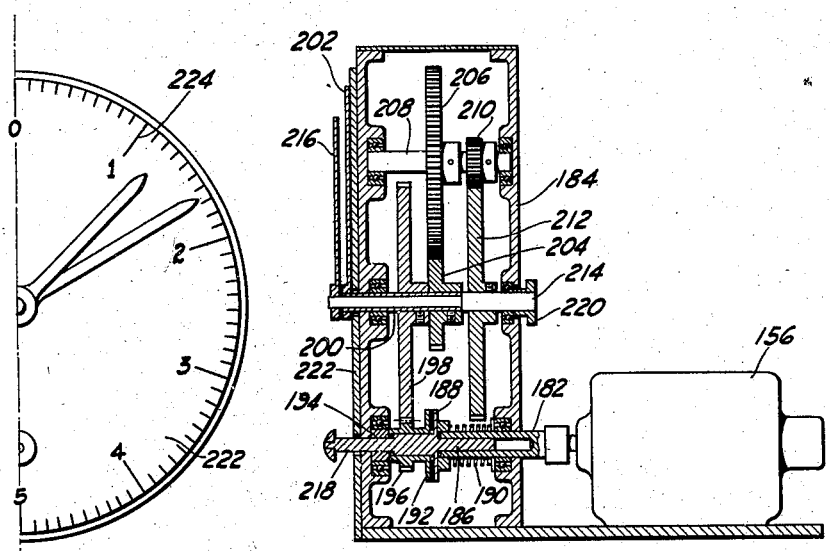
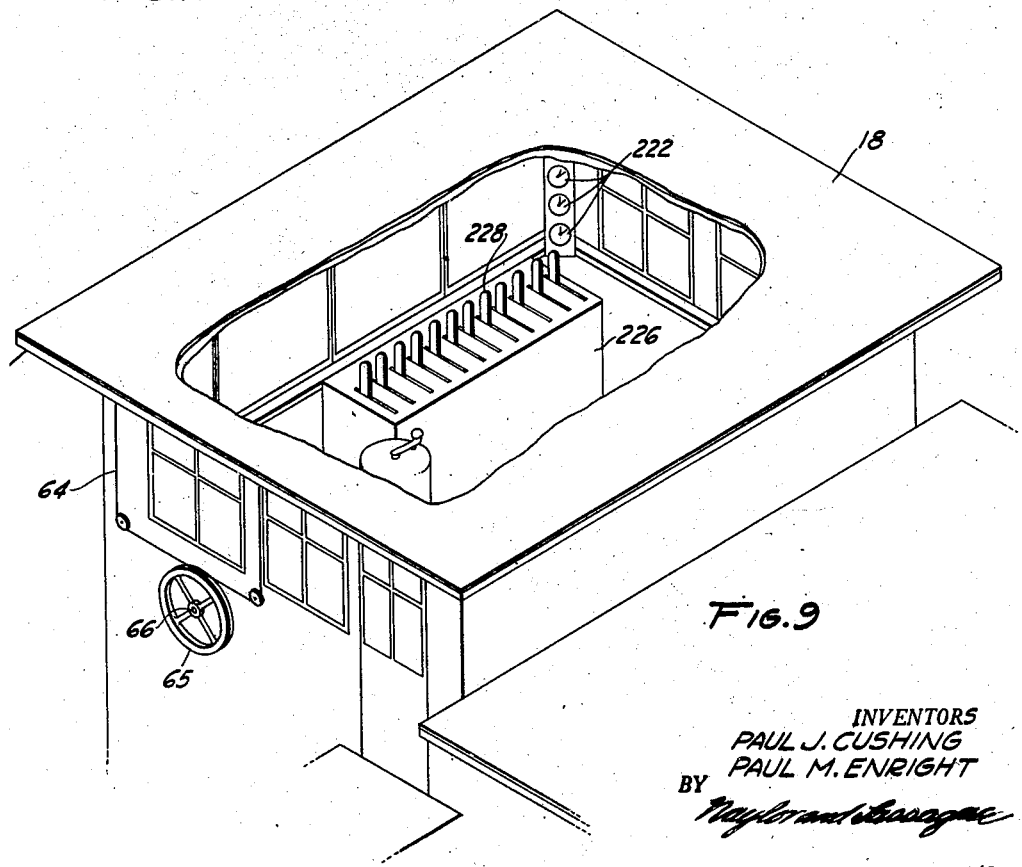
INVENTORS
PAUL J. CUSHING
PAUL M. ENRIGHT
BY
ATTORNEYS Feb. 8, 1949. P. J. CUSHING ET AL 2,461,311
CONTROL SYSTEM FOR HYDRAULIC DREDGES
Filed Dec. 29, 1945 7 Sheets-Sheet 6

INVENTORS
PAUL J. CUSHING
PAUL M. ENRIGHT
BY
ATTORNEYS

INVENTORS
PAUL J. CUSHING
PAUL M. ENRIGHT
BY

ATTORNEYS

Patented Feb. 8, 1949

2,461,311

UNITED STATES PATENT OFFICE 2,461,311

CONTROL SYSTEM FOR HYDRAULIC DREDGES

Paul J. Cushing, Piedmont, and Paul M. Enright, Oakland, Calif., assignors to Hydraulic Dredging Company, Ltd., Oakland, Calif., a corporation of Delaware Application December 29, 1945, Serial No. 637,946

9 Claims. (Cl. 114—230)

This invention relates to hydraulic dredges, and more particularly to means for accurately positioning a hydraulic dredge for deep water operation.

A normal operating depth of a conventional hydraulic dredge is approximately forty-five feet beneath the surface of the water. When operating at these depths, it is customary to orientate the dredge in relation to that portion of the waterbed to be dredged and to move the dredge along in definite relation thereto by the utilization of a pair of spuds, vertically movable anchor posts located at the stern of the dredge and adapted to be extended downwardly into the water bed. One spud is used as a pivot while dredging, the other spud being used to step the dredge forwardly.

Often the water is too deep or rough to permit the use of spuds, and, on these occasions, the dredge is positioned by wires. Three such wires are used, one leading astern of the dredge and the other two leading to each side or quarter of the dredge, and each wire leads from an anchor to a common point at the stern and from thence to winch drums. When these wires are taut, the dredge is held in position for digging. As each set-up or positioning of the dredge for a specific operation is completed, the dredge is stepped forwardly by paying out the required distance on the stern wire and taking in an equal distance on each quarter wire.

It has been the practice to station a winchman at the drum to make the set-ups upon receipt of a signal from the leverman or dredge positioner. Because of the human equation involved, this method necessarily leads to a certain amount of confusion in the relaying of signals, and, at best, results in the use of two men for the positioning operation of the dredge.

The instant invention makes it possible for one man to execute the positioning operation, and to do so in a more accurate manner than the conventional method.

The improved method of operation made possible by said instant invention utilizes three winch drums, one for each of the three conventional wires. The location of these drums on the dredge is unimportant as long as they are positioned so that the wires can be led to them and the brakes and clutches of the drums can be operated by the leverman at the control station of the dredge.

Since it is impossible to place the three drums where the leverman can see them well enough to measure the input and output of the wires therefrom, and since the leverman must know the exact measure of movement of each wire in order to step the dredge ahead accurately with respect to distance and direction, it is intended that a remote signalling device, giving the exact movement of each wire, shall be so placed as to be under the convenient surveillance of the leverman at the control station.

Six self-synchronizing motors are used, a pair for each of the three wires. One motor of each pair, the transmitter, is installed on a spring loaded platform with a rubber-tired wheel of predetermined diameter mounted on the shaft of said motor. The wheel frictionally engages one of the three wires and is turned by it with no attendant slippage between the wheel and wire. For each unit of movement of the wire, the wheel makes a predetermined unit of angular rotation.

The other motor in each pair, the receiver, is mounted at the control station and the shaft of said motor follows the movement of the shaft of the transmitter motor exactly. The receiver actuates, through a gear reduction unit, two hands on a dial marked to read in feet and tens of feet from zero to one hundred.

With the three dials in front of him, the leverman has full control and knowledge of the movements of the three wires.

An object of the invention, therefore, is to provide a system for centralized positioning control of a hydraulic dredge.

Another object of the invention is to provide a system for completely controlling the operating position of a hydraulic dredge from the control station of said dredge.

A further object of the invention is to provide a centralized system for the accurate stationing and relative movement of a wire-held hydraulic dredge with respect to the material to be dredged.

Still a further object of the invention is to provide a single station control system for wire-held hydraulic dredges such that one individual can move the dredge to a predetermined location within limits and simultaneously accurately determine whether the desired positioning has been consummated.

And yet a further object of the invention is to provide a centralized control station for a wire-held hydraulic dredge having means at said station for causing the dredge to be moved and means at the station for determining the exact amount of movement.

Another object of the invention is to provide a control system for a hydraulic dredge adapted to be positioned by a stern wire, two quarter wires, and a port wire and a starboard wire leading from each side of the prow of the dredge, each wire having an anchor at the end thereof and being adapted to be moved over a winch-drum to lengthen or foreshorten the wire and position the dredge in any manner, and each wire having means associated therewith to provide for the accurate determination of the movement of said wire at the control station of the dredge.

And still a further object of the invention is to provide a method of relatively positioning a plurality of sheaves located on the stern of the dredge, each sheave being adapted to have passed thereover one of three wires used to position the stern of the dredge about a point, said method being calculated to provide for ready accessibility of the sheaves and wires for repair work thereon without the necessity of discontinuing the operational use of all of said sheaves and wires.

And yet another object of the invention is to provide a method of relatively positioning the three sheaves on the stern of the dredge adapted to have passed thereover the three wires used to position the stern of the dredge about a point, said method being adapted to provide for a minimum of strain on the three wires when the prow of the dredge is moved laterally.

Other objects and advantages of the invention will be apparent from the following description taken in conjunction with the drawings forming part of this specification, and in which:

Figure 3 is a view in elevation of the sheave and wire assembly at the stern of the dredge;

Figure 4 is a side elevation view of Figure 3;

Figure 9 is a view in perspective, partly broken away, of the control station of the dredge and the control mechanism therein;

Figure 10 is a view in elevation of a receiver motor for one of the three stern positioning wires showing a section of the dial system connected thereto;

Figure 11 is a left side view in elevation of a portion of the dial face of Figure 10;

Figure 1:
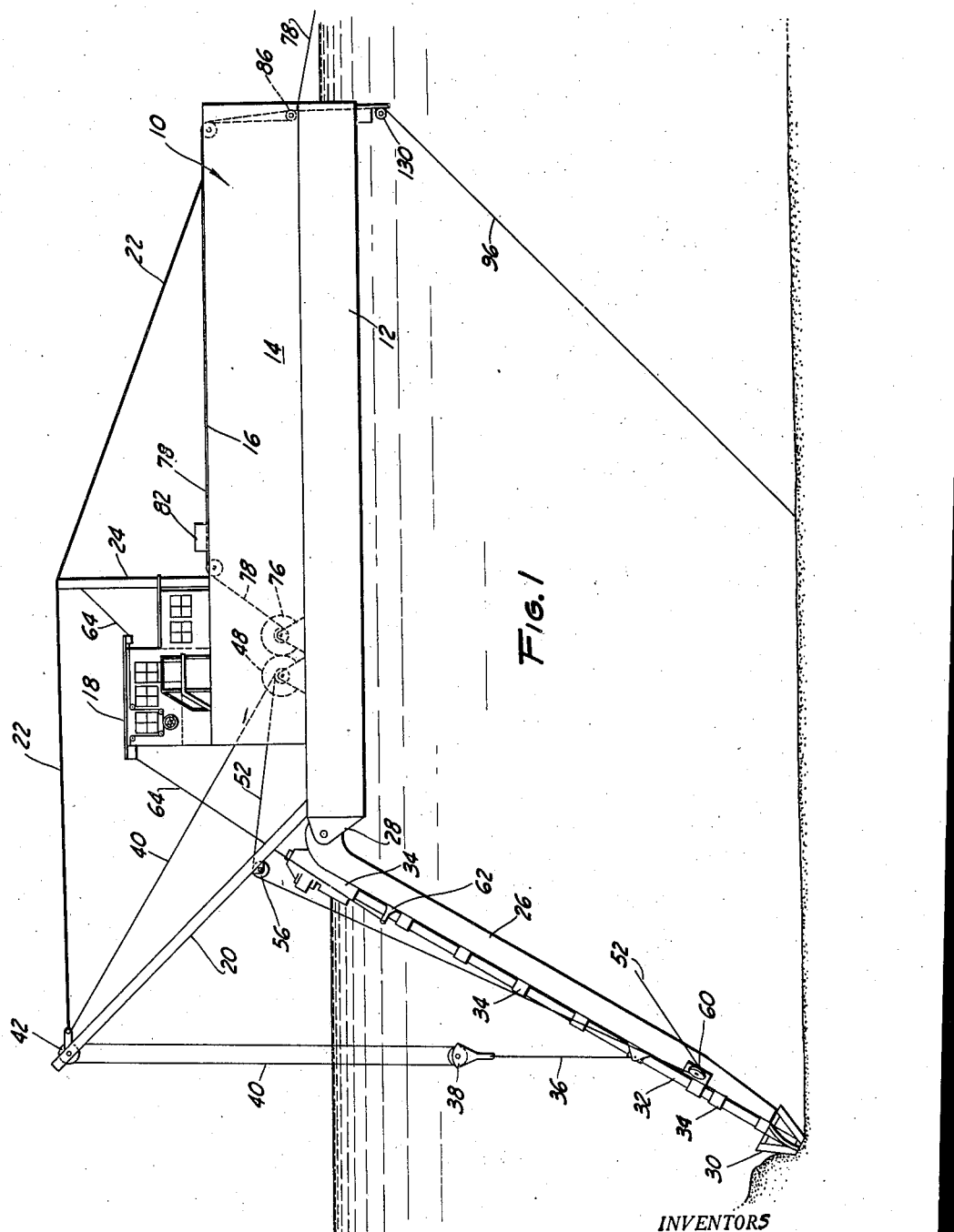
Figure 1 is a view in elevation of a hydraulic dredge.
Figure 2:
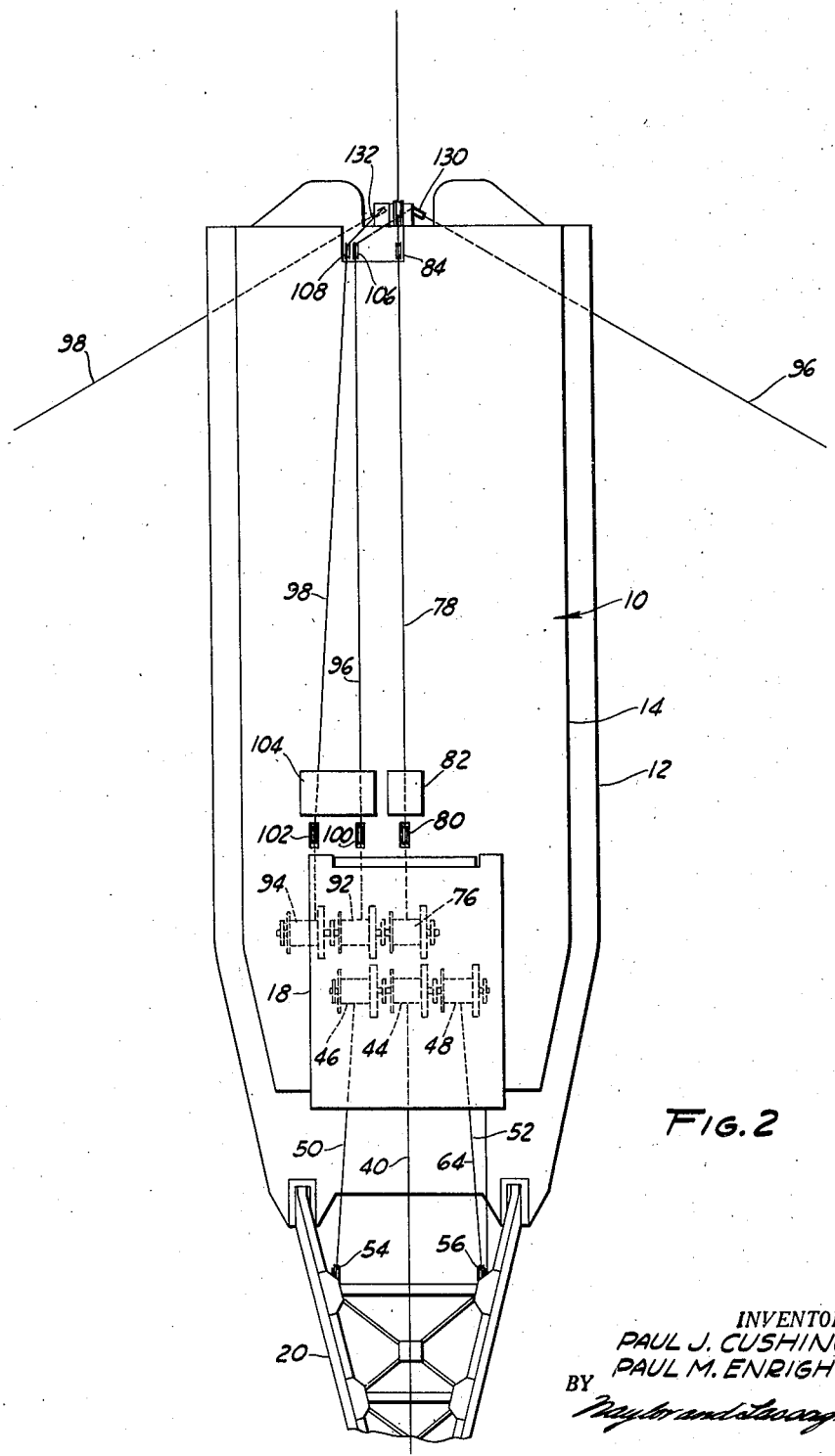
Figure 2 is a plan view of the hydraulic dredge.
Figure 7:
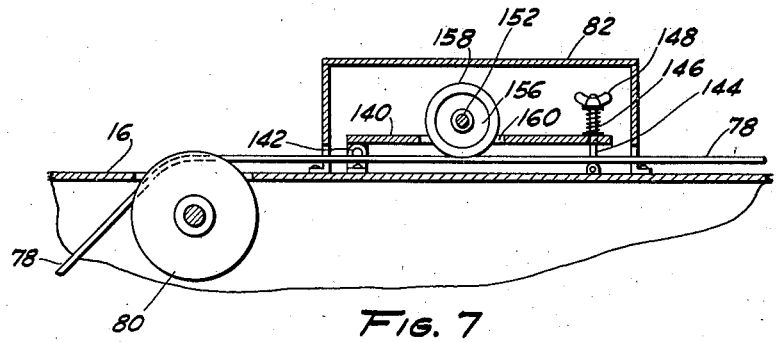
Figure 7 is a sectional view in elevation of one of the stern wires and its attendant transmitter unit.
Figure 8:
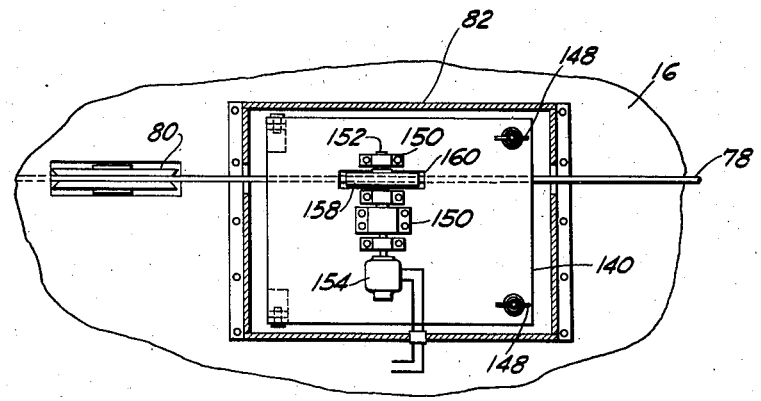
Figure 8 is a plan view of Figure 7.

Referring to the drawings for more specific details of the invention, 10 indicates generally a hydraulic dredge having a hull 12, a superstructure 14, a deck 16 on the upper surface of the superstructure, and a control station 18 secured to deck 16. A cantilever boom 20 having one end pivotally mounted in a manner, not shown, to the hull 12 is braced against angular movement by cables 22 secured at each side of the upper end of the boom 20, said cables being guided and supported by a trussed tower 24 supported on deck 16 and being anchored on the after portion of deck 16 in any conventional manner.

A digging ladder 26 mounted on trunnions 28 on the hull 12 has at the extreme end thereof a cutting head 30 adapted to be rotated by a cutting head shaft 32 supported on the ladder 26 by a plurality of bearing 34, said shaft being adapted to be driven by a motor 34 supported on the ladder 26. The ladder 26 has attached thereto a cable 36 supported by one end of a block pulley 38, and a cable 40 supporting the sheave of the block pulley 38 passes over a sheave 42 mounted for rotation in the upper end of the cantilever boom 20 and from thence to a winch drum 44, having brake and clutch controls, not shown, supported on the hull 12 within the superstructure 14. The lengthening or foreshortening of the cable 40 by the winch drum 44 is effective to raise or lower the digging ladder 26.

Winch drums 46 and 48, supported for rotation on the hull 12 within the superstructure 14 and having brake and clutch controls, not shown, have cables 50 and 52, respectively, connected thereto, said cables passing over sheaves 54 and 56 mounted for rotation on opposite sides of the lower portion of the cantilever boom 20. The cables 50 and 52 extend from the sheaves 54 and 56 over sheaves 58 and 60 mounted for rotation on opposite sides of the digging ladder 26 to anchors, not shown, oppositely disposed with respect to said ladder.

Figures 13, 14:
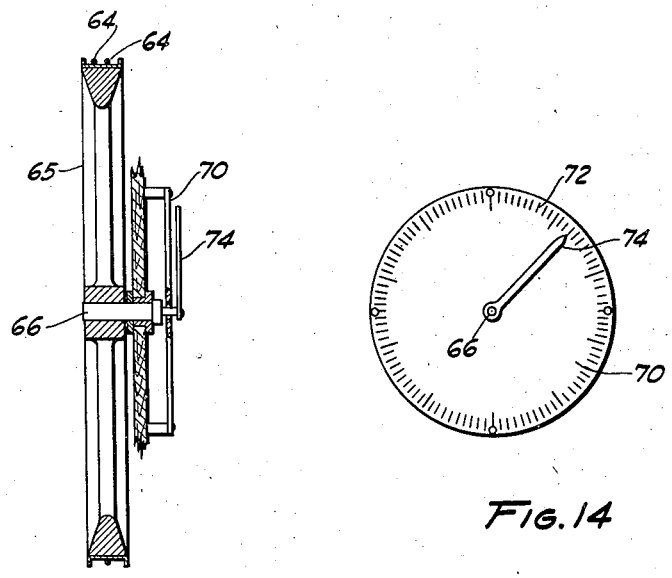
Figure 13 is a view in section of a sheave and dial for the control wire of Figure 12.
Figure 14 is a view in elevation of the dial of Figure 13.

Attached to a fixed arm 62 on the digging ladder 26 is a wire 64, and said wire passes over a plurality of small sheaves to a large sheave 65 keyed to a shaft 66 supported for rotation in a wall of the control station 18. The wire 64 makes a 360 degree turn on sheave 65 and passes over a plurality of sheaves to a well 67 in the tower 24 where said cable is attached to a weight 68. A stationary indicating dial mounted on bearings as shown (see Figure 13) has on the face thereof a plurality of indices 72, and a movable indicating arm 74 fastened on the end of shaft 66 to rotate therewith is adapted to move concomitantly with the moving of wire 64, upon the raising or lowering of the digging ladder 26 by movement of the cables 40 and 36, to indicate on the calibrated dial 70 the operating depth of the cutter head 30.

A winch drum 76, mounted for rotation substantially amidship and having brake and clutch mechanism, not shown, has connected thereto a cable 78 passing upwardly and rearwardly therefrom over a sheave 80 and through a housing 82. The cable 78 extends substantially the length of deck 16 to pass over a sheave 84 mounted for rotation on the edge of the deck. The cable 78 then extends from sheave 84 to sheave 86, mounted for 180-degree traverse in lug 88, and from thence to a stern anchor, not shown. Lugs 88 are bolted to a frame member 90, secured, as by bolts, to the end of the hull 12.

Figure 6:
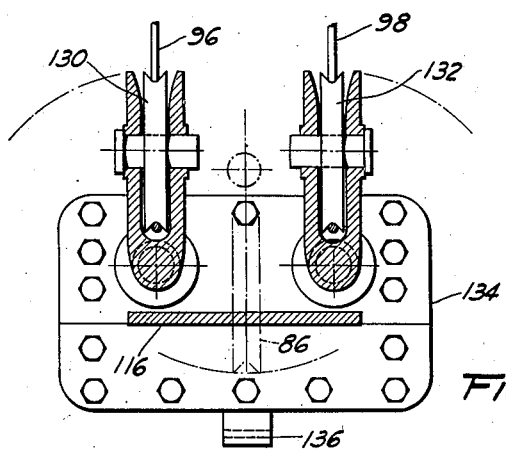
Figure 6 is a view along lines 6—6 of Figure 3.
Figure 5:
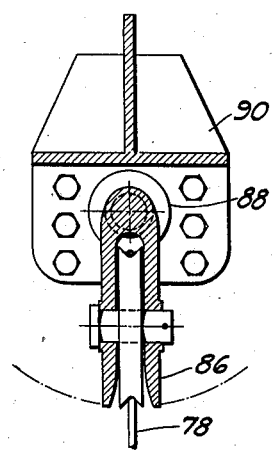
Figure 5 is a view along lines 5—5 of Figure 3.
Figure 12:
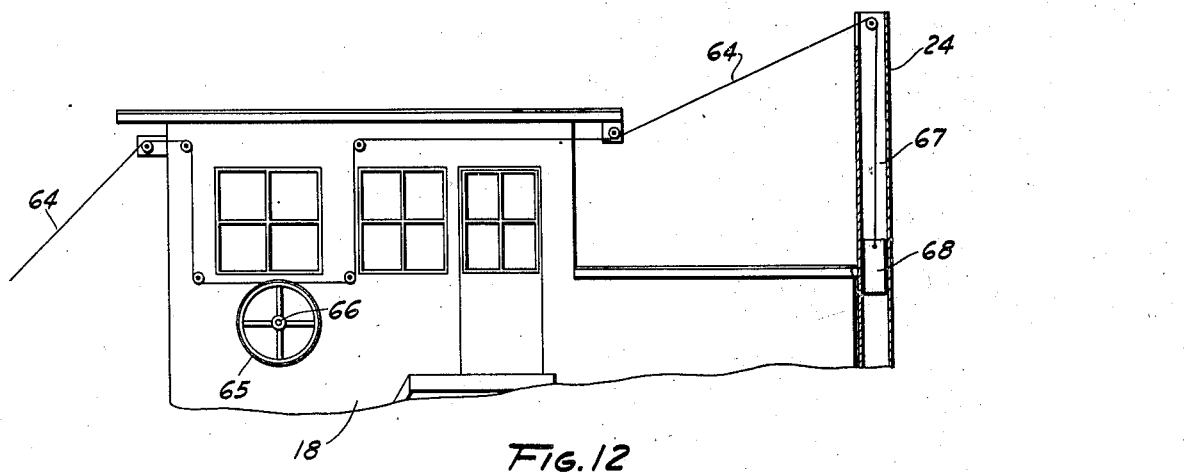
Figure 12 is a view in elevation of the control station showing one of the control wires for lateral movement of the prow of the dredge.

Winch drums 92 and 94, similar to drum 76 and located adjacently thereto, have connected thereto, respectively, cables 96 and 98, said cables passing rearwardly and upwardly over guide sheaves 100 and 102, through housing 104, and rearwardly along the deck 16 to sheaves 106 and 108 mounted for independent rotation on shaft 110, said sheaves being mounted substantially flush with the deck 16 in a manner similar to that of sheave 84. The cables 96 and 98 pass downwardly from sheaves 106 and 108 over guide sheaves 112 and 114 mounted for rotation in a spud well 116 angularly inclined with respect to the vertical axis of the hull 12 (see Figure 3), said spud well 116 having lugs 118 adapted to be received between spaced lugs 120 on the hull 12 and to be pinioned therein by dowel pins 122 and 124 passing through sleeves 126 and 128 secured to the hull 12. The cables 96 and 98 pass over pivotable sheaves 130 and 132, respectively, mounted on an extension member 134 of the spud well 116 and adapted to have a traverse of 180 degrees. Cables 96 and 98, after passing over sheaves 130 and 132, extend forwardly of the stern and are attached to anchors, not shown, spaced laterally from the dredge. It will be noted from an examination of Figures 3 and 6 that the plane of the vertical axis of stern sheave 86 is substantially equidistant from the axes of quarter sheaves 130 and 132. Since the purpose of the two anchored quarter lines 96 and 98 and the stern line 78 is to position the stern of the dredge about a vertical pivot line, it is well, in order to eliminate unwanted components of force, to have the axial planes of sheaves 86, 130 and 132 coincide in so far as this is possible.

Upon the removal of dowel pins 122 and 124 from sleeves 126 and 128 and the application of an upward and outward force to the spud well 116 by tying a line into a lug 136 on the bottom of extension 134 of said spud well (see Figure 4), it is possible to swing the spud well 116 about the pivot 138 to the upper level of the hull 12 for purposes of repair or examination of the wires and sheaves carried by spud well 116.

A housing 82, secured to the deck 16 and through which cable 78 passes, houses one of three similar units, the other two being contained in housing 104. For purposes of disclosure, a description of one of the three similar units will suffice for the three.

The housing 82, connected as by bolts to the deck 16, contains therein a plate 140 hinged to support members 142 connected to the deck 16. Bolts 144 connected to the deck 16 pass through the other end of the plate 140, and said end of the plate 140 is yieldingly urged toward the deck 16 by springs 146 held in tension by wing nuts 148 threaded on the bolts 144. Supported for rotation on the plate 140 by bearings 150 mounted on said plate is a shaft 152 of the self-synchronizing motor 154 also mounted on plate 140.

The shaft 152 has keyed thereon a wheel 156 having a rubber-covered periphery 158, extending through a slot 160 in the plate 140. The wheel 156 is pressingly urged into frictional engagement with the wire 78 by the springs 146, so that any movement of the wire 78 within the housing 82 is faithfully translated into rotational motion of the wheel 156 and consequent rotation of the shaft 152 supporting the wheel. Since the wheel 156 is of a predetermined diameter, the movement of a measured unit of wire 78 will cause a definite angular movement of the shaft 152.

Figure 15:
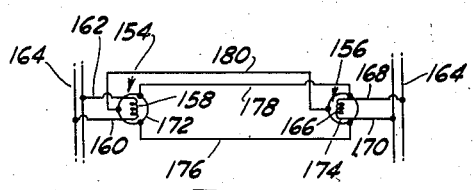
Figure 15 is a schematic diagram of the connections for a self-synchronizing transmitter motor and a self-synchronizing receiving motor.

The motor 154 is the transmitter motor of the pair of transmitter-receiver motors used in conjunction with each of the wires 78, 96, and 98, the receiver motor adapted to be used in conjunction with the transmitter motor 154 being designated as 156 in Figure 10. These motors are commonly known as "Selsyn" motors, the word "Selsyn" being the trade mark name of motors of this type manufactured and sold by the General Electric Company of Schenectady, New York. Standard units of this type have their rotors wound with a single phase winding, while the stators have a three-element, Y-connected winding. The excitation is single phase and is transmitted to the rotor winding. Both of the rotors of the transmitter and of the receiver must be excited from the same single phase source. A typical connection between a transmitter motor and a receiver motor of this type is shown in Figure 15, wherein the transmitter motor 154 is schematically shown to have a single phase rotor winding 158 and leads 160 and 162 connecting said rotor winding with a single phase excitation source 164. The receiver motor 156 has a rotor 166 wound with a single phase winding, and said rotor has leads 168 and 170 leading therefrom to a single phase excitation source 164, the same source to which the leads of the rotor 158 of the transmitter motor 154 are connected. Each element of the three-element Y-connected winding of the stator 172 of the transmitter motor 154 is connected to a similar element of the three-element Y-connected winding of the stator 174 of the receiver motor 156 by leads 176, 178, and 180.

It will be apparent from an examination of Figure 15 that a movement of the rotor of transmitter motor 154 is substantially duplicated by the rotor of the receiver motor 156, there being a very minute error in the transmission proportional to the load on the rotor shaft of the receiver motor 156. The rotational movement of the shaft 152 of the generator 154 caused by any movement of the wire 78 in engagement with the wheel 156 is duplicated by a shaft 182 connected to the rotor of receiver motor 156.

Shaft 182 extends into a housing 184 and is supported for rotation therein by bearings, as shown in Figure 10, said shaft being sleeved on and keyed to a shaft 186 having a clutch flange 188 adapted to be yieldingly urged, as by spring 190, into engagement with another clutch flange 192 on a sleeve 194 keyed to shaft 186. The sleeve 194 is supported for rotation by bearings as shown, and said sleeve carries a gear wheel 196 adapted to mesh with a large gear wheel 198 keyed on a sleeve 200 supported for rotation by bearings and having keyed thereon an indicating pointer 202. Gear wheel 198 has a hub having thereon a gear 204 adapted to mesh with the gear wheel 206 keyed on a shaft 208 mounted for rotation within the housing 184 on bearings as shown. Also keyed on shaft 208 is a gear 210 adapted to mesh with a gear wheel 212 keyed on a shaft 214 supported for rotation by bearings and having keyed at one end an indicating pointer 216. A portion 218 of shaft 186 is movable inwardly with respect to the housing 184 against the spring 190 to disengage the clutch flange 188 from the clutch flange 192 and thus prevent the transmission of movement between shaft 182 and gear 196 on sleeve 194. When this is done, a knob 220 on shaft 214 may be manually turned to reset the indicating pointers 202 and 216 to the zero position on a dial face 222 having a plurality of indices 224, said dial face being located on the face of the housing 184.

Figure 9 illustrates a portion of the interior of the control station 18 showing the location of indicating dial 222, one of three such dials, the other two dials being used in conjunction with wires 96 and 98 to indicate the movement thereof. Also shown within the control station is a control box 226 having therein a plurality of levers 228, one pair of each six pairs of said levers being adapted to operate one of the six winch drums hereinabove described. One lever in each pair is for actuating a clutch to move the drum forwardly to reel in the wire, and the remaining lever is used for controlling a brake to regulate the paying out of the wire or to hold the drum against any movement whatever.

For the purpose of describing the operation of the dredge and the control system thereof, the dredge will be assumed to be in the operating position shown in Figure 1. The anchoring of the stern wire 78 and the quarter wires 96 and 98 serve to establish a vertical line pivot for the stern of the dredge, while the anchoring of the lines 50 and 52 on the starboard and port sides of the dredge serve to fix the dredge with respect to lateral movement. The leverman in the control station 18 knows the operating depth of the cutter head 30, since the cable 64, the sheave 65 and the pointer 74 indicate said position to the leverman on the dial face 70. The motor 34 is then actuated to drive the cutter head 30, and, as the work is done by the cutter head, digging ladder 26 is made to describe an arc to follow the work by pivoting the dredge through a shortening of one of the lines 50 or 52 caused by the leverman actuating an appropriate lever 228 to drive one of the winch drums 46 or 48 in the reverse direction. Thus an arc-like path is gouged from the water bed.

The dredge 10 and the digging ladder 26 are concomitantly pivoted by lengthening or shortening the wires 50 and 52. When a complete arc-like cut has been made in the water bed, it is necessary to step the dredge forwardly to prepare for the next cut. This is done by rotating the winch drum 76 in the reverse direction to pay out a predetermined amount of cable 78, said amount being indicated to the leverman by pointers 202 and 216 on indicating dial 222. The movement of the cable causes rotation of the wheel 156 in the housing 82 and consequent rotation of shaft 152, the rotor shaft of transmitter motor 154. The amount of rotation of the rotor shaft 152 is duplicated by a similar amount of rotation of rotor shaft 182 of receiver motor 156, said motion being translated through appropriate transmitter-receiver wiring connections, as schematically shown in Figure 15. Shaft 182 causes rotation of shaft 186, clutch flange 188, clutch flange 192, gear 196, gear wheel 198, and sleeve 200 to cause movement of the indicating pointer 202 to indicate the smaller units of measurement of the movement of wire 78. The rotation of sleeve 200 and gear wheel 198 causes the rotation of gear 204, gear wheel 206, shaft 208, gear 210, gear wheel 212, and shaft 214 to cause a movement of the indicating pointer 216 to measure the larger units of movement of wire 78.

As the wire 78 is paid out, quarter wires 96 and 98 are taken up equally by forward movement of the winch drums 92 and 94, respectively. This foreshortening of wires 96 and 98 serve to step the dredge forwardly a predetermined amount, said amount being indicated on dials, similar to dials 222, located in the control station 18, since each of the wires 96 and 98 have a transmitter-receiver motor pair, similar to motors 154 and 156 for wire 78, to accurately transmit the amount of movement of said wires on the indicating dials within the control station 18.

When the leverman is satisfied from examination of the dial 222 that the dredge is in position for the next cut, he halts the movement of the winch drums 76, 92 and 94 by use of the appropriate levers 228. The dredge is again in the position, shown in Figure 1, to begin another dredging cut.

It will be appreciated that all the levers and dials necessary for the complete operation of the dredge and accurate positioning thereof are all centrally located in the control station 18 where they may be under the surveillance of one man.

Figure 16:
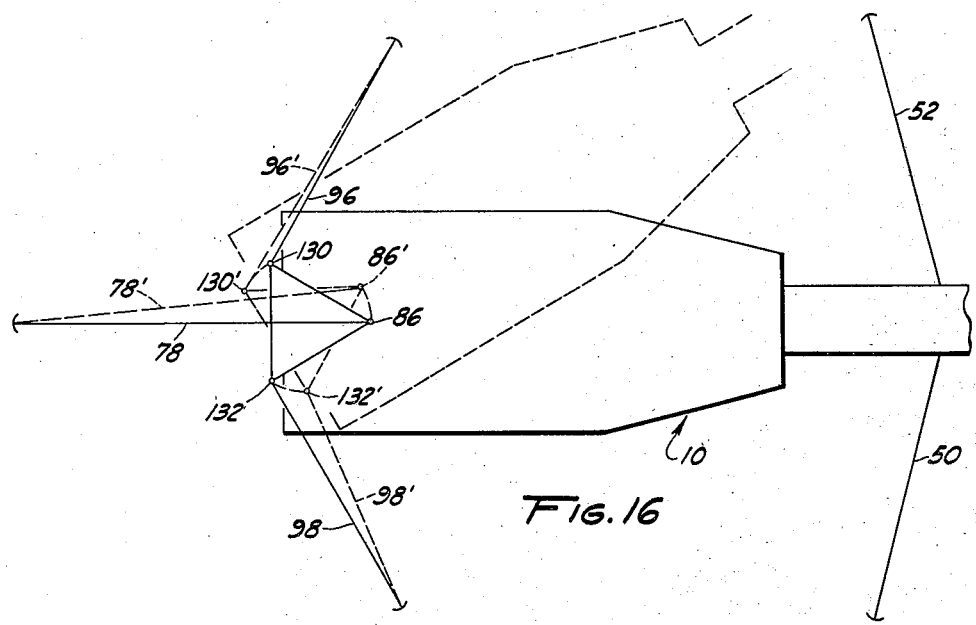
Figure 16 is a schematic diagram of exaggerated size showing the preferred relative location of the stern sheaves and the resultant pivoting thereof when the prow of the dredge, shown in shadow outline, is moved laterally.
Figure 17:
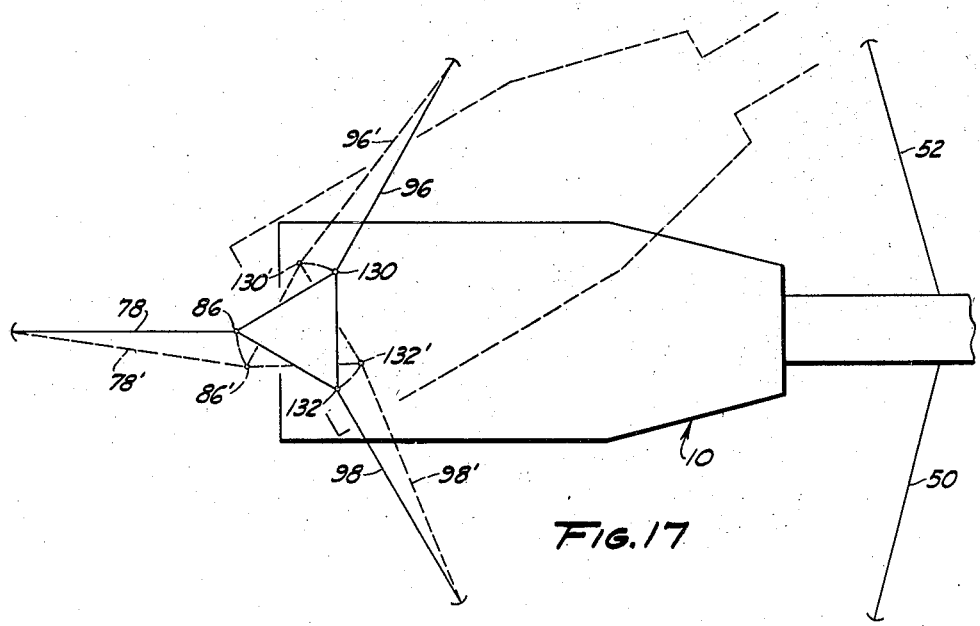
Figure 17 is a schematic diagram, similar to Figure 16, showing a conventional method of relatively locating the stern sheaves.

Figure 16 is a diagrammatic illustration of the relative positioning of the pivot point of the sheaves 86, 130, and 132 located on the stern of the dredge and used in conjunction with wires 78, 96, and 98, respectively. Figure 16, as well as Figure 17, is an exaggerated plan view of the stern sheave system. The three stern positioning wires 78, 96, and 98, as well as the two wires 50 and 52 used to position the bow of the dredge in making a dredging cut are shown to be anchored, and the pivot points of sheaves 86, 130, and 132 are shown to constitute roughly an equilateral triangle. In following a dredging cut, the bow, as hereinabove described, is swung either port or starboard by the shortening or lengthening of wires 50 or 52, the wires 78, 96, and 98 not being used in this bow swinging operation. For purposes of illustration, let us assume that the bow is pivoted to the left, as viewed in Figure 16, by a shortening of wire 52. As this occurs, the pivot points of sheaves 86, 130, and 132 swing with the dredge to describe an arcing movement to assume the position shown at 86', 130', and 132'. This movement causes a slight slackening in the wire 78, since this wire assumes the new position of 78' which is slightly shorter than 78. Similarly, the wire 98, in its new position 98', also has become slightly slackened. The third wire 96 is put under tension to assume the position 96' where it is longer than in its original position, a catenary slack in wire 96 having been taken up in the lengthening process. Thus it will be seen that two of the three stern positioning wires are slackened and the third is tightening upon the pivoting of the dredge bow. This method of locating the pivot points of the three stern sheaves results in a minimization of the danger of dragging any of the three stern anchors or the snapping of any of the wires through undue tension being applied thereto and is the method of sheave pivot location used in this invention.

As contrasted with the method of pivot location shown in Figure 16, Figure 17 illustrates a conventional manner of locating the sheave pivot on the stern of the dredge. In Figure 17 the pivot point of sheave 86 is located astern of the pivot points of sheaves 130 and 132. Assuming a similar bow pivoting operation as outlined hereinabove for Figure 16, the pivoting points 86, 130 and 132 describe arcing movements to reach new positions 86', 130', and 132'. As these pivot points move through the pivoting movement of the dredge, wires 78, 96, and 98 assume the new positions 78', 96', and 98'. It will be seen from an examination of Figure 17 that 98' is longer than 98, 96' is longer than 96, and 78' is longer than 78. Thus, all three stern positioning wires have become tightened, and the danger of the wires snapping or the anchors on the ends thereof being pulled loose from their positions on the water bed is ever present.

It can be demonstrated that if the sides of an imaginary equilateral triangle joining the pivot points of the three stern sheaves are as much as ten inches in length, the pivoting of the bow of a conventional sized dredge operating on conventional sized wires is sufficient to snap these wires when the pivot points of the stern sheaves are located in a manner similar to Figure 17. The manner of locating the sheave pivot points in the instant invention, as demonstrated in Figure 16, has, therefore, readily apparent advantages over the manner of locating the sheave pivot points in Figure 17.

The location of sheave 86 above the water level, as contrasted with a conventional location of all three stern sheaves beneath the water level, offers certain advantages. If the lines leading from the under water sheaves, or the sheaves themselves, become fouled in operation they can be raised above the water level for repair by pivoting the spud well 116. When this is necessary, wire 78 at the stern of the dredge and wires 50 and 52 at the bow of the dredge may be kept in their anchored position to maintain the dredge in the position it held before the under water sheaves were raised. A conventional method of locating all three stern sheaves under water necessitates the raising of all three, since they are generally located in a single well, in case of the necessity for repair work. When such an occasion for repair work occurs, the dredge is held by wires 50 and 52 only and is free to swing with the current or the wind. Much time must be spent in relocating the dredging cut after the repair work is finished.

While the preferred embodiment of the invention has been shown and described, it is understood that modifications in the invention may be made within the spirit of the invention and the scope of the appended claims.

What we claim as new and desire to secure by Letters Patent is:

1. On a hydraulic dredge having a control station, a plurality of mooring wires adapted to position the vessel for dredging operation, and means including control devices located at said control station for retracting or lengthening each wire, an electrical signalling device for each wire comprising a self-synchronizing transmitter motor having a rotor shaft adapted to be rotated by a movement of the wire, a self-synchronizing receiver motor, a plurality of wire leads connected to the motor so that the rotor of the receiver motor is adapted to reproduce the movement of the rotor of the transmitter motor, a dial for each wire at the control station, each dial having indicating means associated therewith and connected to the rotor shaft of a receiver motor to indicate the direction of movement and magnitude of said movement of one of the mooring wires.

2. On a hydraulic dredge having a control station, a plurality of mooring wires adapted to position the vessel for dredging operation, and means including control devices located at said control station for retracting or lengthening each wire, an electrical signalling device for each wire comprising a self-synchronizing transmitter motor having a rotor shaft, a wheel mounted on the rotor shaft in frictional engagement with the wire, said wheel and rotor shaft being adapted to be rotated by a movement of the wire, a self-synchronizing receiver motor having a rotor shaft, a plurality of wire leads connecting the motor so that the rotor of the receiver motor is adapted to reproduce the movement of the rotor of the transmitter motor, a dial for each mooring wire at the control station, each dial having movable indicators associated therewith and connected to the rotor shaft of the receiver motor to indicate the direction of movement and magnitude of said movement of the mooring wire.

3. On a hydraulic dredge having a stern mooring wire and a pair of quarter mooring wires leading from the stern of the dredge, a sheave for each wire at its point of departure from the dredge, a pivot for each sheave, said three pivots constituting the points of a triangle in a plan view of the dredge; the pivot for the stern wire sheave lying forward of the two quarter pivots, whereby the distance between two of said pivots and the respective anchors for wires passing over said sheaves is shortened upon sideward movement of the bow of the dredge and tensioning of said wires is avoided.

4. On a hydraulic dredge having a stern mooring wire and a pair of quarter mooring wires leading from the stern of the dredge, a sheave for each wire at its point of departure from the dredge, a substantially vertical pivot for each sheave, said pivots for the quarter wire sheaves being substantially equidistant from the bow of the dredge and spaced substantially equidistantly from the longitudinal axis of the dredge, and said pivot for the stern wire sheaves being located on a longitudinal axis of the dredge nearer the bow than the aforesaid pivots; whereby the distance between two of said pivots and the respective anchors for wires passing over said sheaves is shortened upon sideward movement of the bow of the dredge and tensioning of said wires is avoided.

5. On a hydraulic dredge having a stern mooring wire and a pair of quarter mooring wires leading from the stern of the dredge, a sheave for each wire at its point of departure from the dredge, said sheave for the stern wire being located above the level of the water and said sheaves for the quarter wires of necessity being located below the level of the water, a pivot for each sheave, said pivots for the quarter wire sheaves being located equidistantly from the bow of the dredge and spaced slightly apart, and said pivot for the stern wire sheave being located between the aforesaid pivots and closer to the bow of the dredge as viewed in a plan view of said dredge.

6. On a hydraulic dredge, a stern mooring wire, a sheave for said wire mounted on the stern of the dredge above the surface of the water, a pair of quarter mooring wires, a sheave for each wire carried within a spud-well substantially below the surface of the water, said spud-well being adjacent the stern and pivotally supported by the stern, the relative location of the three sheaves being such that either the stern wire or the quarter wires may be rendered inoperative without the remaining wire or wires being rendered inoperative.

7. On a hydraulic dredge having a stern mooring wire and a pair of quarter mooring wires leading from the stern of the dredge, a spud-well depending from the stern of the dredge, a sheave for each quarter mooring wire located in the lower portion of the spud wheel beneath the surface of the water, a sheave for the stern quarter wire located on the stern of the dredge above the surface of the water, said spud-well being pivotally mounted on the dredge whereby said spud-well may be raised for repair or examination of the quarter mooring wires or sheaves thereof and whereby the stern mooring wire may be still operative.

8. On a dredge having a stern mooring wire and a pair of quarter mooring wires leading from the stern of the dredge, means constituting a pivotal connection between each wire and said dredge at the point of departure of the wire from the dredge; the pivotal connection for the stern wire lying forward of the pivotal connections for the two quarter wires; whereby the distance between two of said pivotal connections and anchors for the respective wires is shortened upon sideward movement of the bow of the dredge and tensioning of said wires is avoided.

9. A stern mooring system for dredges comprising a pair of quarter wire sheaves mounted adjacent the stern of the dredge, quarter wires secured to the dredge and passing around said sheaves and forwardly with respect to the dredge, a stern sheave, a stern wire secured to the dredge and passing around said stern sheave and rearwardly with respect to the dredge, means whereby each of said wires may pivot in an effectively horizontal plane with respect to the dredge; said pivot means being disposed so that the pivoting points of the quarter wires are laterally spaced substantially equidistantly from the longitudinal axis of the dredge, and the pivoting point of the stern wire is forward of a line connecting the pivoting points of the quarter wires; whereby tensioning of said wires upon sideward movement of the bow of the dredge is avoided.

PAUL J. CUSHING.
PAUL M. ENRIGHT.

REFERENCES CITED

The following references are of record in the file of this patent:

UNITED STATES PATENTS

| Number | Name | Date |
| --- | --- | --- |
| 227,595 | Taylor | May 11, 1880 |
| 484,763 | Bowers | Oct. 18, 1892 |
| 653,475 | Howe et al. | July 10, 1900 |
| 1,743,741 | Warren | Jan. 14, 1930 |
| 2,242,520 | Grundborg | May 20, 1941 |
| 2,293,730 | Guttmann | Aug. 25, 1942 |

FOREIGN PATENTS

| Number | Country | Date |
| --- | --- | --- |
| 350,017 | Germany | Dec. 5, 1915 |